Figure 1:
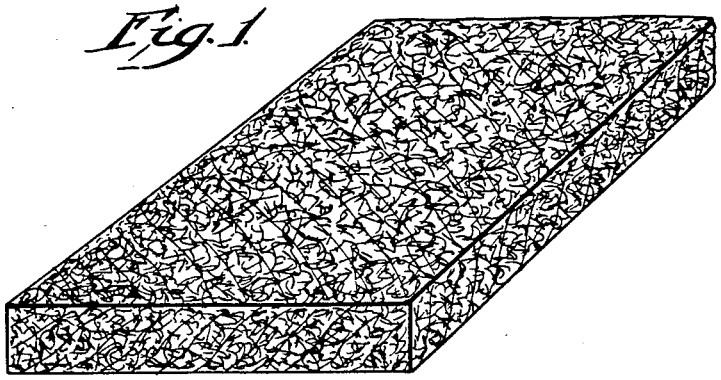

July 12, 1960     A. B. BUSH, JR., ET AL     2,944,930

FIBERBOARD

Filed April 16, 1957

Inventors
Arthur B. Bush Jr.
Alice C. Weil
By Edw. A. Hampson
Attorney.

United States Patent Office 2,944,930
Patented July 12, 1960

2,944,930
FIBERBOARD

Arthur B. Bush, Jr., and Alice C. Weil, New Orleans, La., assignors to The Celotex Corporation, Chicago, Ill., a corporation of Delaware Filed Apr. 16, 1957, Ser. No. 653,149

10 Claims. (Cl. 162—145)

This invention concerns an incombustible fiberboard product and its processes and methods of manufacture.

Since the term "incombustible" is quite indefinite unless defined, for the purposes hereof, incombustible fiberboard is such fiberboard as will pass the test required for class "A" incombustible fiberboard products when tested in accordance with Federal Specifications SS–A–118b.

The incombustible fiberboard hereof comprises principally an admixture of mineral fiber and cellulose fiber to the extent of approximately 90 to 95% thereof together with other minor ingredients, as hereinafter set out and described.

In the past fiberboards have been made from up to approximately 100% mineral fiber and of various proportions of admixtures of mineral fiber and cellulose fiber. These have been of two types broadly referred to, on the one hand, as insulating fiberboards of relatively low density and providing both insulation against the transmission of heat and sound absorption; whereas, the heavy and dense such products bonded with various binding ingredients and having little or no insulation against the transmission of heat or sound absorption are generally referred to as "structural" board. So far as is known, none of such relatively light weight products, having sufficient strength and handleability for general use, have had such properties that they can pass the test required for class "A" incombustible rating as above defined.

This invention comprehends the production of a light weight boardform product comprised principally of mineral fiber and including cellulose fiber with a minor content of other ingredients which product is sufficiently strong and handleable for use in building construction and for sound absorption, and which provides insulation against the transmission of heat and is capable of passing the test required for classification as a class "A" incombustible product.

The principal object of the invention is the class "A" incombustible board-form product just above referred to. Other objects of the invention are the provisions of procedures and manufacture whereby such product may be commercially produced on the large board-forming machines, such as are now in general use in the production of fiber insulation board. These board machines are of the general nature of paper-making machines but which, over the course of years, have been developed and modified to the extent that there can now be produced thereon fiber insulating boards such as are now generally available on the market at a relatively high rate of production and on an economical basis.

Other and further objects of the inventions hereof will be apparent to one reading the following description of the product hereof and the methods and procedures of its manufacture.

The nomenclature herein of certain of the components of the compositions involved will be identified as specifically set out below, and such components will then subsequently be herein referred to in accordance with such nomenclature.

Sodium bentonite is a colloidal clay chiefly montomorillionite $$H_2O(Al_2O_3, Fe_2O_3, 3MgO)4SiO_2 \cdot nH_2O$$

Such sodium bentonite is prepared and sold as National Baroid Bentonite by the National Lead Company, Houston, Texas. An equivalent bentonite is that identified as "Volclay" produced by the American Colloid Company. Equivalent material is, of course, available from other sources. This type of bentonite, the so-called "sodium bentonite," has base exchange properties giving up sodium and potassium ions and taking up bivalent cations. Also it expands accordion-like in water and thus the spaces between the sheets of atoms, of which it is composed, enlarged, permitting ions and colloidal particles not only to be absorbed onto the surface, but also absorbed within the latter-like structure of the molecule.

Calcium bentonite. Herein such term will identify the non-swelling type of bentonite generally referred to and identified as "calcium bentonite" due to the fact that it is characterized by the inclusion therein of about 1.48% calcium. This type of bentonite comprises approximately 85% montomorillionite, the balance being chiefly glauconita. This calcium bentonite does not have the base exchange property of sodium bentonite nor does it expand in water accordion-like to any appreciable degree, if at all. Such bentonite, produced in Mississippi by American Colloid Company, is representative of this class of material.

Protein as used herein is a soybean protein including solubilizing additives containing approximately 78% protein. For solubilizing the protein there is admixed about two percent sodium sulfite and 18% borax. Protein from other sources may be substituted with suitable solubilizing additives. A representative of such protein is "Buckeye," Prostren B, produced and sold by The Buckeye Cotton Oil Company, Cincinnati, Ohio.

China clay. An air-floated clay, chiefly aluminum silicate, and in connection herewith normally a white, air-floated clay. A representative of such china clay is produced and sold by the J. W. Huber Company, Huber, Georgia.

As above referred to, felt-like products comprised of mineral wool or mineral wool and cellulose fiber with various binders have been produced in the past, but so far as is known all such products, having characteristics such as would classify such as "heat insulating and sound absorbing materials," have been merely relatively soft, felt-like products. The product of the inventions hereof is a relatively stiff board-form material which, although of such density and physical structure as to constitute heat insulating and sound absorbing material, is a relatively rigid product capable of being shipped and handled in connection with ordinary construction operations. Particularly, the product hereof is of sufficient rigidity and handleability that it may be perforated from a face thereof, as by drilling, punching, or the like, to enhance the ability of the material to absorb sound for acoustical correction. The physical structure and properties of the product are such that clean holes can be drilled in the material so that it can be fabricated into acceptable perforated acoustical tile or the like, fully competitive in appearance with similar tile on the market comprised entirely of cellulose fiber.

The product hereof can be felted from a fluid suspension of the fibers on any of the usual type fiberboard felting machines, whether of the Fourdrinier, Oliver Filter, an ordinary cylinder machine, or various variations thereof. Fundamentally the procedure of producing the product comprises the steps of forming a dilute suspension of the fibers, the felting of the fibers from such suspension, and subsequent drying of the formed sheet.

Since the invention hereof is of quite broad application in its specific field, it is to be understood that its applicability is not limited to the several specific examples which will be hereinafter set out, but that it may be utilized in its field wherever applicable.

Figure 2:
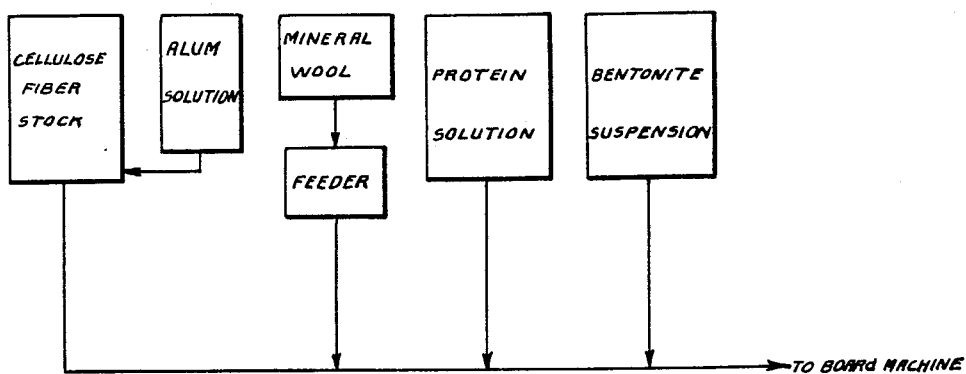

In the accompanying drawing, the Fig. 1 is a perspective view of the board-form product and Fig. 2 is a diagrammatic illustration of the steps of manufacture.

While, as stated, the procedures involved in the production of the product hereof are substantially those of the manufacture of paper, it is to be understood that cellulose fibers, as utilized herein, are distinguished from paper fibers as such fiber is recognized. Paper fiber is finely divided fibrous material, being ordinarily so finely divided that the individual fibers are not in the least visible to the unaided eye when such fibers have been formed into a paper sheet. As distinguished from paper fiber, the cellulose fibers hereof are extremely coarse, being what is commonly referred to in the art as "insulating board fiber" and in which substantially all the fibers are sufficiently coarse as to be readily apparent to the unaided eye when formed into a board product.

The mineral fibers hereof are, preferably, mineral wool fibers of diameter within the range from approximately four to eight microns, it being preferred, however, that such be of average diameter of between approximately five to seven microns.

According to the invention hereof such mineral wool fibers and cellulose fibers together with the protein ingredient and bentonite are made up in a slurry which, if of the proper consistency, is the stock which is supplied to the felting apparatus for forming the desired board-form felted fiber sheet.

Representative insulating and sound absorbing boards have been made from such following compositions:

Mineral wool, 57.7%  
Cellulose fiber, 32.7%   Density .287 g./cc.  
Protein, 4.8%            Tensile 193.5 lbs./sq. inch  
Sodium bentonite, 4.8%

Satisfactory board has also been made with the composition:

Mineral wool, 78.5%  
Cellulose fiber, 9.8%    Density .341 g./cc.  
Protein, 4.9%            Tensile 125 lbs./sq. inch  
Sodium bentonite, 6.8%

A still further example of satisfactory board-form product, although not capable of qualifying as incombustible due to the relatively high cellulose content, is as follows:

Mineral wool, 48.35%  
Cellulose fiber, 46.42%  Density 0.324 g./cc.  
Protein, 1.93%           Tensile 205 lbs./sq. inch  
Sodium bentonite, 3.29%

The preferred composition of the fiber stock for producing the rigid type board sheet which will qualify as incombustible, and which has optimum density and tensile strength for heat insulation and sound absorption and has ample strength and handleability is:

Mineral wool, 62.0%  
Cellulose fiber, 31.0%   Density 0.29 to 0.31 g./cc.  
Protein, 5.0%            Tensile 125 lbs. min. to 160 lbs./sq. inch  
Sodium bentonite, 5.0%

With respect to the foregoing compositions, it is to be understood that in making up a fiberboard stock furnish that the percentages of compositions cannot be rigidly maintained, and that the various percentages as set out will fluctuate to some extent and that the specific figures given are indicative of the desired composition to be maintained.

Examples have been given of such board having a composition up to approximately 80% mineral fiber to slightly below 50% mineral fiber. The invention is equally applicable, as will clearly hereinafter appear, not only to the specific compositions, but the novel feature hereof is generally applicable in connection with the manufacture of products in which the mineral wool content is reduced substantially to or to zero.

It is not to be understood, however, that board-form products hereof cannot be made outside the limits just above referred to. When the mineral wool content exceeds about 80% the product takes on more of a blanket or felt characteristic, that is, it becomes excessively soft or flabby for classification as board-form products. When the mineral fiber content is below approximately 60% or even down to approximately zero percent, board-form products can be satisfactorily produced, but board with below about 60% mineral fiber does not pass the incombustible test referred to.

Satisfactory boards have been made with each, the protein and sodium bentonite, ingredient incorporated in the amount of less than 2% by weight, and it is believed reasonable, although no actual board has been made and tested, to assume that below about 1% of each of such ingredient will affect the board characteristics to such a small extent that it may be said that below 1% the additives are ineffective in improving the board characteristics.

Boards have been made incorporating protein to about 5% and with bentonite to around 8%. Of course, as these higher contents of additive ingredients are reached, the cost of the product is increased more than commensurate with improvement in the quality of the finished board product. All indications are that an increase in the protein content increases board strength up to at least about 10% of such addition, but it is doubted that economically and commercially there is any need for such addition to an extent greater than approximately 5%, which is indicated as the amount balancing both quality and economics and is most productive of results.

The sodium bentonite ingredient is effective from about 1% by weight up to a maximum of about 10% in connection with producing board economically on a fiberboard machine, since incorporation in a greater amount slows the stock excessively so that the production rate is decidedly reduced. This situation just mentioned, however, does not mean that a greater amount of the sodium bentonite cannot be incorporated in what might be termed "hand" made boards where the sheet is formed on a screen in an individual mold where drainage time is not of extreme importance. Boards can be made by a molding procedure containing up to at least about 20% sodium bentonite.

To determine that there is a particular and new coaction arising from the inclusion of the protein content and sodium bentonite in the product, experiments were made comparing the effect of each, individually, in forming boards of mineral wool and fiber composition. As an example, control board of the formula 48% mineral wool, 45% cellulose board fiber and approximately 3% sodium bentonite, with varying amounts of protein, produced boards having densities and tensile strength as follows:

| Protein | Density, g./cc. | Tensile, lbs./square inch |
|---|---|---|
| 2.91 | 0.294 | 158.8 |
| 3.88 | 0.305 | 176.5 |
| 4.85 | 0.324 | 205.9 |

In contrast with the foregoing and using fiber stock in substantially the same proportions, boards incorporating only the protein or sodium bentonite gave results as follows:

| | Density, g./cc. | Tensile, lbs./square inch |
|---|---|---|
| Protein: | | |
| 3% | 0.262 | 85.0 |
| 4% | 0.268 | 107.3 |
| 5% | 0.291 | 136.6 |
| Sodium Bentonite: | | |
| 2% | 0.279 | 76.9 |
| 3% | 0.291 | 77.9 |
| 4% | 0.296 | 75.9 |
| 5% | 0.311 | 77.9 |

From the foregoing it is evident that the combination of the protein-sodium bentonite additive is much more effective than either the protein or bentonite alone, particularly in that while it may be possible to obtain substantially the same physical characteristics by a substantial increase of the protein content, there is being added increasingly larger amounts of combustible which will adversely affect the fireproofing tests and result in the board produced failing to meet the incombustible rating, which is the principal object of the compositions of the inventions hereof.

In the manufacture of the incombustible board product, the principal objective of the inventions hereof, the procedure is that of preparing the fiber suspension according to the procedures following, it being assumed that the mineral wool and cellulose board-forming fibers are available, produced as usual procedures.

The most satisfactory procedure for making up the stock for forming the board is that of dispersing the cellulose fiber with about 0.8% rosin soap or equivalent sizing in water suspension. Acid or papermaker's alum solution is then added to pH of about 5 to 5.5. The loose mineral wool fiber is then added with gentle agitation to form a suspension of cellulose and mineral wool fibers at about 2% consistency for use on the board-forming machine. The protein ingredient, if a soluble protein, or if an insoluble protein, put into solution with 2% sodium sulfite and about 18% borax, is added to the fiber stock, which should be slowly agitated to maintain the suspension and admix the protein ingredient.

The sodium bentonite is preferably put into water suspension by suitable agitation, and this is also fed into the agitated fiber stock. The so combined ingredients, assuming that suspension has been brought to the proper consistency, then feeds to the fiberboard machine where it is felted as a thick sheet which drains and is dried according to the usual practices in the making of fiber insulating board.

In the combination of ingredients above and from which can be produced the incombustible fiberboard product, as above particularly referred to, it appears that the sodium bentonite reacts with the protein ingredient to form a strengthening and reinforcing bond in the structure of the board. Sodium bentonite has base exchange properties giving up sodium and potassium ions and taking up bivalent cations. While it has not been proved, it is believed and advanced as the theory of the reaction occurring that the sodium bentonite takes up the trivalent aluminum cations either directly from the acid alum or from the aluminum-substituted protein molecules modified by the acid alum included in the stock suspension. The sodium bentonite molecule expands in water in an accordion-like manner thus enlarging the spaces between the sheets of the atom to permit ions in colloidal particles to be not only absorbed onto the surface but also adsorbed in the lattice-like structure of the molecule, and that the effect in the felted sheet is to improve the structural strength of the board due to the formation of very strong, voluminous bridges or bonds developed by such reaction of the bentonite with the original protein molecule, according to the procedure described.

In connection with the foregoing invention and in order that the potentialities thereof may be realized, a number the features thereof will be specifically set out. In this connection, it will be assumed that the board is to be of the fiber insulation and sound absorbing type having in general the physical characteristics of such type board, and of a thickness of about one-half inch. Heretofore, so far as is known, it has been impossible to produce such a product having the physical properties classified as fiber insulation board and as sound absorbing material which can obtain class "A" incombustible rating, and which has sufficient strength and handleability so that it may be properly classed as a fiber insulating board.

In the formula given above, board having approximately 60% of mineral wool fiber content will have properties so that it may be properly classified with a class "A" rating as incombustible fiber insulation and sound absorbing board. The formulation including 80% mineral wool fiber will, of course, pass the class "A" incombustible rating and, as shown, it is of density and has tensile strength imparting to the board the properties of heat insulation and sound absorption and is classifiable as a board product. It is to be understood, of course, that formulations ranging from about 60% to about 80% will fall within the range of the two boards specifically just above referred to and are of the same general character. As pointed out, boards with a mineral wool content appreciably below the 60% figure are not sufficiently incombustible to attain a class "A" rating, whereas boards above 80% mineral wool fiber are in general too dense, tend to be somewhat soft, and are not sufficiently handleable to be properly defined as board products but, however, such can attain the class "A" incombustible rating, so that depending upon circumstances, that is, the physical properties required, such are usable products for specific uses where their properties are not detrimental.

It is to be understood, of course, that the percentages of the protein and sodium bentonite ingredients, as above given, are not absolute, and that they may be varied to a limited extent in the fiber stock suspension to produce the degree of freeness necessary for proper board formation on the board machine. For example, in the formulation incorporating 62% mineral wool and 31% cellulose fiber, column 3 hereof, the percentage of either or both, the protein or sodium bentonite ingredient, may be varied somewhat. Reasonable variation of the content of protein does not particularly affect the formation or properties of the board sheet, although there is a tendency that less of the protein ingredient will cause some reduction in tensile strength and handleability of the board produced; whereas, generally, the effect of increasing the content of protein ingredient is that of improving tensile strength and handleability of the board.

The effect of a variation of the sodium bentonite content is more apparent than is the effect of a variation of the content of the protein ingredient. Due to the voluminous nature of the sodium bentonite in the fiber stock it tends to affect drainage time of the stock and consequently board formation on the board machine, although otherwise variation of the content as given in the formulation has little effect on the properties of the finished board.

In the case of various fiber stocks, due to varying procedures for refining the cellulose fraction, or due to some variation in the size or length or other property of the mineral wool, it is normal that the fiberboard stock suspension made up therefrom will have varying drainage rates or freeness, as such is generally referred to.

If, due to the character of the fiber stock, it is not sufficiently free-draining, the sodium bentonite of the formulation may be reduced by a reasonable amount to make the stock more free or, if the stock is too free, the sodium bentonite content can be increased within a reasonable amount to provide a slower draining stock. It must, of course, be understood that in the immediately foregoing a reasonable degree of variation of the ingredients must be observed, but in general variation in the particular formula by as much as about 50% plus or minus will not greatly alter the final board product.

In connection with the foregoing, to determine that the effect of the sodium bentonite in the composition is specific to this ion-exchange type bentonite, comparative experiments were made substituting in a comparative formulation, in one case white china clay and in the other case the so-called "calcium" bentonite. In each of the substitutions it was clearly apparent that neither of the substituted materials had the same effect in the composition as did the sodium bentonite in the composition with which such was compared.

The control composition comprised 60% mineral wool, 34% cellulose board-forming fiber, 3% protein ingredient and 3% sodium bentonite. The compositions in which the white china clay and calcium bentonite were substitued produced lighter boards, density approximately 0.275 as compared with density 0.294, indicating such substitutions had decreased the freeness of the stock so as to be slower draining and thus be more bulky and of lighter weight.

The tensile strength of the so-substituted board formulations average approximately two-thirds of the tensile strength of the control board incorporating the sodium bentonite, and such is believed to clearly evidence that the bonding action of the protein and sodium bentonite as above referred to, or the equivalent thereof, was not obtained.

The cellulose fiber stock incorporated in the board, in order to impart water-repellence to the fiber, has preferably incorporated therewith in the suspension approximately 0.8% rosin size. This rosin size content, when the paper-maker's alum is added, reacts therewith to form a water-repellent complex attached to the fibers and thus imparts water-repellence or waterproofing to the fibers.

The fireproof board made in accordance with the foregoing description, however, even without the rosin sizing referred to, has some water-repellence. Apparently the modified protein content resulting from the reaction between the papermaker's alum, the protein and the bentonite is relatively insoluble, and the complex precipitated on or adsorbed to the fibers of the board imparts some waterproofing thereto. This waterproofing effect can be further increased by the addition of a small amount of formaldehyde, say, about 1% by weight of the solids thereof, added to the stock before the board is felted therefrom. The effect of this formaldehyde is to further insolubilize the protein complex and additionally improve the waterproofness of the board.

There having been above described the fireproof fiberboard comprising the inventions hereof, together with the procedures for the production thereof, it is deemed that those skilled in the art to which the invention appertains may readily exercise the inventions described and produce improved insulating and sound absorbing fiberboards of advantageous properties. It is to be particularly noted that the invention is not limited to the production of fireproof boards, as above defined, but that reference has been made above to the manufacture of similar boards, however not capable of passing the class "A" incombustible tests but which boards, nevertheless, have desirable and novel properties.

The inventions having above been fully disclosed, we claim:

1. An incombustible heat insulating and sound absorbing fiberboard comprising by weight not less than about 60% mineral fiber together with not more than about 40% combustible fiber and the product of the reaction in acid suspension of between about 1.5 to five percent solubilized protein and 1½ to 10% sodium bentonite.

2. An incombustible heat insulating and sound absorbing fiberboard comprising by weight about 60% mineral fibers, between about 3 to 15% of the product of reaction in solution of solubilized protein and sodium bentonite in the presence of aluminum ions, and the balance thereof comprising cellulose fiber.

3. Fiberboard bonded with in excess of 2% by weight thereof of the product of reaction of solubilized protein and sodium bentonite in acid suspension.

4. Fiberboard bonded with in excess of 2% by weight thereof of the product of reaction of solubilized protein and sodium bentonite in acid suspension in the presence of aluminum ions.

5. Fiberboard bonded with in excess of 2% by weight thereof of the product of reaction of solubilized protein and sodium bentonite in the presence of aluminum ions at pH of 5 to 5.5.

6. The fiberboard bonding agent comprising the reaction product of solubilized protein and sodium bentonite in the proportions by weight of about 5 parts to 2 parts at pH 5 to 5.5 in the presence of aluminum ions.

7. The fiberboard bonding agent comprising the product of reaction of solubilized protein and sodium bentonite in the proportions by weight of about 5 parts to 2 parts in solution acidified with papermaker's alum.

8. An incombustible sound insulating and sound absorbing fiberboard comprising by weight about 62% mineral wool fibers and about 31% organic fibers and bonded with the product of reaction of about 5% solubilized protein and 2% sodium bentonite in suspension acidified with papermaker's alum to pH of about 5 to 5.5.

9. The method of producing a fiberboard by the steps of preparing a dilute suspension of fiber acidified with papermaker's alum to pH of between about 5 to 5.5 and incorporating solubilized protein and sodium bentonite with the subsequent steps of felting of the fibers from the dilute suspension and drying of such felted fibers.

10. The method of producing an incombustible heat insulating and sound absorbing fiberboard by the steps comprising preparing a dilute suspension of preponderantly mineral fiber and a minor proportion of organic fiber acidified with papermaker's alum to pH of about 5 to 5.5 and including solubilized protein containing about 78% actual protein and sodium bentonite followed by the steps of forming a felted board from such suspension and drying the board so felted.

References Cited in the file of this patent

UNITED STATES PATENTS

| | | |
|---|---|---|
| 2,034,519 | Larson | Mar. 17, 1936 |
| 2,158,987 | Maloney | May 16, 1939 |
| 2,681,290 | Baker et al. | June 15, 1954 |
| 2,773,763 | Scott | Dec. 11, 1956 |